(12) United States Patent
Fakeih

(10) Patent No.: US 9,317,537 B2
(45) Date of Patent: Apr. 19, 2016

(54) DATABASE AND METHOD FOR EVALUATING DATA THEREFROM

(76) Inventor: Adnan Fakeih, Jeddah (SA)

(*) Notice: Subject to any disclaimer, the term of this patent is extended or adjusted under 35 U.S.C. 154(b) by 281 days.

(21) Appl. No.: 12/890,474

(22) Filed: Sep. 24, 2010

(65) Prior Publication Data

US 2011/0078141 A1  Mar. 31, 2011

Related U.S. Application Data

(60) Provisional application No. 61/246,022, filed on Sep. 25, 2009.

(51) Int. Cl.
*G06F 17/30* (2006.01)

(52) U.S. Cl.
CPC .......... *G06F 17/30289* (2013.01); *G06F 17/30* (2013.01); *G06F 17/30312* (2013.01); *G06F 17/30536* (2013.01)

(58) Field of Classification Search
CPC ...................................................... G06F 17/30
See application file for complete search history.

(56) References Cited

U.S. PATENT DOCUMENTS

| | | | | |
|---|---|---|---|---|
| 5,809,483 | A * | 9/1998 | Broka et al. | 705/37 |
| 6,901,383 | B1 * | 5/2005 | Ricketts et al. | 705/36 R |
| 7,685,044 | B1 * | 3/2010 | Robertson et al. | 705/35 |
| 2003/0157504 | A1 * | 8/2003 | Chee | B01J 19/0046 435/6.11 |
| 2004/0013292 | A1 * | 1/2004 | Raunig | G06K 9/0014 382/128 |
| 2004/0185482 | A1 * | 9/2004 | Stuelpnagel | B01J 19/0046 435/6.11 |
| 2005/0256413 | A1 * | 11/2005 | Astrom | A61N 1/365 600/509 |
| 2008/0235222 | A1 * | 9/2008 | Mojsilovic | 707/6 |

FOREIGN PATENT DOCUMENTS

| | | |
|---|---|---|
| JP | 2007-150484 | 6/2007 |
| JP | 2007-271239 | 10/2007 |

OTHER PUBLICATIONS

Jiang et al., "Extraction of Investment Strategies based on Moving Averages: A Genetic Algorithm Approach", 2003, Hong Kong University of Science and Technology.*
Kleinman, "The New Commodity Trading Guide: Breakthrough Strategies for Capturing Market Profits", Mar. 2009, FT Press.*
Brown, "Smoothing, Forecasting and Prediction of Discrete Time Series", 2004, Dover Publications.*
Chandra R et al.: "Managing temporal financial data in an extensible database" 19th International conference on very large data bases, Data bases proceedings, Morgan Kaufmann Publishers, Palo Alto, CA 1993, pp. 302-313.
Elmasri R et al.: "Implementation options for time-series data", Temporal databases: Research and Practice, Proceedings of Seminar, Jan. 1, 1998, pp. 115-128.
Chaudhuri S et al.: "An Overview of Data Warehousing and OLAP Technology", SIGMOD Record, ACM, New York, NY, US, vol. 26, No. 1, Mar. 1, 1997, pp. 65-74.
Vision and Activities for Massive and High Speed Data Processing Technologies toward information Explosion Era; vol. 90 No. 07 612-613/IT Innovation for Actualizing and Intellectual Creative Society; Authors: Yuichi Mori, Yuji Kakutani, Itaru Nishizawa, Tsunehiko Baba; Transmission Date: Jul. 1, 2014.

* cited by examiner

*Primary Examiner* — Rehana Perveen
*Assistant Examiner* — Huen Wong
(74) *Attorney, Agent, or Firm* — Seed IP Law Group PLLC

(57) ABSTRACT

A computer system for calculating a quantity from a set of input values is disclosed. The computer system comprises a database that is configured to store a sequence of first input values $x_n$ wherein n=1, 2, ... i, wherein for any value of n, $x_n$ lies between $x_{n+1}$ and $x_{n-1}$ in the sequence. Each value of x has associated with it a second input value $y_n$, a conversion value $p_n$ that is calculated from $y_n$ according to a conversion algorithm, and an output value $z_n$, wherein $z_n = z_{n-1} + p_n$. The database is configured to store the plurality of output values $z_n$.

21 Claims, No Drawings

DATABASE AND METHOD FOR EVALUATING DATA THEREFROM

CROSS-REFERENCE TO RELATED APPLICATION

This application is a Non-Provisional application, based on U.S. Provisional Patent Application No. 61/246,022, entitled Database and Method for Evaluating Data Therefrom, filed Sep. 25, 2009, the content of which is incorporated herein by reference in its entirety.

FIELD

The present invention relates to databases for storing e.g. financial data, and in particular to computer-implemented methods of constructing a database, storing data in the database and/or methods of manipulating data stored in the database.

BACKGROUND

A database is a structure for storing and relating data within e.g. a computer system. Different database architectures exist depending on the intended usage. The primary use for general purpose databases is to manage and facilitate data entry and retrieval in relation to the relevant application. A recent trend has been the emergence of specialized database architectures optimized to work with specific application domains.

Complex event processing (CEP) is a technology for low-latency filtering, correlating, aggregating and/or computing on real-world event data, e.g. financial data. Such data is usually generated at high frequencies and so needs to be saved in an appropriate database to allow it to be evaluated, whether in real time, or at a later stage. Several specialized database products have emerged which attempt to store such data, which is generated in quantities that normally overwhelm general purpose databases.

The following products are available for use in CEP applications, and provide different functionalities for manipulating CEP data.

| Product | Description | Technology |
| --- | --- | --- |
| Vhayu velocity | High performance proprietary database optimized to work with high-frequency financial market data | Proprietary, non-relational in-memory database |
| KX systems KDB+ | High performance database to monitor real-time events and detect and report faults for data-intensive applications | Optimized, column-based database |
| StreamBase | Event processing platform which allows for development of applications that query and analyze high-volume real-time data streams | Integrated development environment along with specialized compiler |

These products aim to provide improvement of both underlying database technologies and processing capabilities. However, data storage and querying or retrieval of the data is still carried out according to conventional processes. While these databases are well-suited to performing traditional transaction-oriented operations, they do not provide an efficient means for allowing large amounts of contiguous data to be accessed and/or evaluated, other than standard querying methods.

Such requests for large amounts of contiguous data are relevant to the provision of descriptive statistics where the importance of individual records is less than the overall description. Descriptive statistics are now becoming increasingly important especially for high-frequency high-volume data applications.

The process of evaluating large contiguous datasets is central to responding to statistical descriptive data requests.

The financial services community consists of data providers and clients. Data providers deal with both large institutional clients (e.g. banks) and smaller clients (e.g. retail investors). Dealing with the larger clients is either done directly or through $3^{rd}$ party vendors (e.g. Vhayu) to provide them with all market data in order to allow for the construction of sophisticated and accurate statistical variables. However, at present this is not possible with smaller clients due to costs associated with the large bandwidth and computational requirement needed for delivering the complete market feed. Therefore, smaller clients are only provided with market snapshots or summaries, which only allow for variable approximations.

SUMMARY

In a first aspect, the present invention provides a database for storing data, which is configured to generate an intermediate description of the stored data, so as to allow more efficient manipulation of the stored data.

More particularly, the first aspect of the present invention may provide a database that is configured to store a sequence of first input values $x_n$ wherein $n = 1, 2, \ldots i$, wherein for any value of n, $x_n$ lies between $x_{n+1}$ and $x_{n-1}$ in the sequence, and has associated with it:
  a second input value $y_n$;
  a conversion value $p_n$ that is calculated from $y_n$ according to a conversion algorithm; and
  an output value $z_n$, wherein $z_n = z_{n-1} + p_n$;
  the database being further configured to store the plurality of output values $z_n$.

The database is part of a computer system for calculating a quantity from a set of input values.

The first input value $x_n$ is generally a numerical value and is typically a time value.

The second input value $y_n$ may be a variable describing a financial transaction, e.g. price or volume of trade.

The conversion value $p_n$ may be equal to $y_n$. In this case, the output value $z_n$ stored in the database is the cumulative total of all the second input values $y_n$ from 1 to n. Alternatively, the output value $z_n$ may be e.g.

$$\left[\sum_1^n y_n^2\right] \text{ or } \left[\sum_i^n x_n y_n\right],$$

or the cumulative total of a different function $p_n$ of the second input value $y_n$.

By providing a database in which the second input value $y_n$ (e.g. the price of a stock) is stored in cumulative form within the output value $z_n$, the database stores the second input value in intermediate form, i.e. pre-computed or partially-processed form. This means that, in general, fewer operations are required to generate descriptive data from the database of the first aspect of the present invention, than is the case for conventional databases, in which the data is stored in raw, unprocessed form.

Thus, in a second aspect, the present invention provides a computer-implemented method of calculating a quantity from a set of second input values $y_n$ corresponding to a portion of a sequence of first input values $x_n$ extending from n=a to n=b, comprising extracting from a database according to the first aspect of the invention at least an output value $z_n$, wherein n=b.

In general, the method of the second aspect of the invention also includes the step of extracting from the database a further output value $z_n$, wherein n=a.

Using the method of the second aspect of the invention in combination with a database according to the first aspect of the invention, it is typically possible to calculate the following quantities through the retrieval from the database of the output value $z_b$ corresponding to the end of the data sequence of interest, and optionally also the output value $z_a$ corresponding to the start of the data sequence of interest:

| Function $p_n$ | Descriptive statistics available |
|---|---|
| $p_n = y_n$ | Sum |
| $p_n = y_n$ | Mean average |
| $p_n = y_n^2$ | Variance |
| $p_n = x_n \cdot y_n$ | Correlation of first input values and second input values |

Therefore, according to the method of the second aspect of the invention, a range of descriptive statistics relating to a contiguous data sequence may be generated by retrieving just two output values from a database according to the first aspect of the invention. This reduces retrieval costs compared to using a conventional database, where typically all data values in the sequence of interest have to be retrieved. Hence the costs associated with I/O bus usage and/or network bandwidth utilisation tend to be lower for the method of the second aspect of the invention, as compared to conventional data evaluation methods. The computational costs associated with the method of the second aspect of the invention also tend to be lower than for conventional methods.

The reduction in computational costs associated with the method of the second aspect of the invention may be especially relevant in financial applications. The method of the second aspect of the invention may allow all end-users of market data (whether large institutional clients or smaller clients such as retail investors) to generate highly accurate and complex descriptive variables, as required, even if they are not able to access the entire market feed. This is because only small amounts of data need to be sent to the client, and only minimal computation needs to be performed by the client.

In particular, if multiple requests are made that relate to the same data series, the costs of setting up a database according to the first aspect of the invention will be rapidly amortised. Effectively, the database of the first aspect of the invention allows for embedding a major portion of the data description within the stored data itself and thus reduces overall costs on a per request basis when the database is interrogated using the method of the second aspect of the invention.

The cost of generating descriptive statistics using the database of the first aspect of the present invention generally has a low dependency on the size of the data sequence of interest. This is in contrast to conventional databases, in which the cost of generating descriptive statistics is approximately proportional to the size of the data sequence of interest.

By reducing the cost of generating descriptive statistics, the database of the first aspect of the invention also reduces the cost of comparative experimentation e.g. comparison of two data sequences of interest, such as the variation of stock price over two different time periods.

Effectively, any descriptive statistic having an embedded summation operator may be generated by using the method of the second aspect of the invention in conjunction with the database of the first aspect of the invention.

The conversion value $p_n$ of the first aspect of the invention may be a highly complex variable computed from a plurality of raw data values. For example, the conversion value $p_n$ may be a customised index that provides partially-processed input variables for inclusion in the output value $z_n$, which is used in calculations in response to user requests.

This pre-computation of a highly complex variable or customised index may allow a reduction in the amount of data to be retrieved from the database in response to a user query and may also reduce the number of computational steps to be carried out in response to each query. In particular, the pre-computed variable may be re-used to answer different user queries, thus increasing overall efficiency.

The raw data values used for calculation of the pre-computed variable may be weighted statically or dynamically. That is, each raw value may be assigned a specific weight when constructing the pre-computed variable (static weighting) or the weight may vary with time (i.e. may be updated for each record).

In the case of dynamic weighting, each weighted variable (or index) is expensive to produce, and so the cost savings associated with providing a pre-prepared index that can be re-used several times in response to user queries are particularly high.

As an example, in the context of financial applications, the concept of providing a conversion value $p_n$, that is a complex function of a plurality of measured values can be used to construct a market capitalization weighted index of stock prices, where the weight of each stock in the index can change based on its changing market capitalization. Depending on usage of such an index, it could lead to a dramatic savings in both data and computational costs over performing index construction for each individual request.

Pre-computation of data (to provide a conversion value $p_n$ that is a complex variable) also allows for the execution of more complex multilevel operations which can be considered to be descriptions of descriptions. An additional financial applications example is that of construction of several indices each based on a set of stocks weighted according to their market capitalization (e.g. industrial companies index, telecommunications companies index). This would allow for combining indices (or even individual companies and indices) into different subsets in order to monitor their movement.

In general, the database of the first aspect of the invention is configured to store values of x (the first input variable) that are evenly-spaced along the sequence of first input values, such that $x_{n+1} - x_n = x_n - x_{n-1}$.

Typically, where $x_n$ is a time value, the interval between successive time values is less than 0.5 s, preferably less than 0.1 s, most preferably less than 0.05 s.

Typically also, the database is configured to store, e.g., a sequence of first values including over 1000 records, preferably over 10000 records.

The database of the first aspect of the invention may be an adaptation of a conventional database.

Many applications (e.g. the analysis of financial data) make use of time-series data which is continuously growing. In this case, an objective may be to find a subsequence of data in history that best matches the latest subsequence. In many cases, this search process has to be repeated for different subsequence lengths and/or locations. When the data is stored in a conventional database, each search process has to be started afresh, working from the raw data entered into the database.

However, it has been found that in many cases, the process of matching subsequences consists of measuring the distance between corresponding records of the two individual subsequences and then taking the sum of these distance measures to obtain an end matching result. Since this operation has an embedded summation operator, it may be carried out using a suitably-configured database according to the first aspect of the invention, in conjunction with the method of the second aspect of the invention.

More specifically, therefore, in some cases, the function $p_n$ is a function of the distance between $y_n$ and another second input value. The distance is typically a Euclidean distance, but may be another distance measure, such as Mahalanobis distance.

Therefore, the database of the first aspect of the invention may be configured to calculate and store cumulative distance measures between e.g. a recent data sequence and a historical sequence. In this way, the distance between the subsequence of the recent data sequence and a corresponding subsequence of the historical data sequence may be calculated from the cumulative distance measures at the start and end of the subsequence.

An advantage of using the invention for this application is that all requested subsequence sizes can be matched easily using only the difference between the start and end of the subsequence compared to all corresponding subsequences in the database. This greatly reduces the expense of having to perform distance measurements between individual records for every request.

Although a substantial number of operations may have to be carried out to store cumulative values of the distance in the database, the retrieval and computing cost per request is low, as only two records need to be retrieved from the pre-computed data. The cost of building the database is therefore amortised rapidly with the number of requests processed.

In some cases, the conversion value $p_n$ is a function of both the second input value $y_n$ and a further input value $y'_n$ associated with the first input value $x_n$. For example, in some cases, $p_n = (y'_n \cdot y_n)$. In this case, the database of the first aspect of the invention may be used in conjunction with the method of the second aspect of the invention to determine the correlation of the second input value $y_n$ with the further input value $y'_n$ corresponding to the portion of the sequence of first input values $x_n$ of interest to the user.

According to the method of the second aspect of the invention, data requests from the database of the first aspect of the invention consist of fetching the start and end of a required period of data. When a fetch/retrieval process is expensive due to latency (for example, when access to a database has to be requested or the data fetched over a network), it is advantageous to pre-fetch data in order to eliminate the latency overhead for additional fetch operations and to make use of temporal locality during caching.

Therefore, the method of the second aspect of the invention may be adapted to include the further step of extracting additional values from the database that are adjacent to the value that is immediately of interest. These additional values may then be used in later calculations.

The latency cost of retrieving multiple data values is close to that for retrieving a single value, and so the overall cost of retrieving multiple values is less than the cost of retrieving each value singly. The additional values are typically stored in a cache from which they may be extracted, as required, at a low latency cost.

Advantageously, the multiple data values that are retrieved in a single fetch operation are a contiguous subsequence of data. This feature increases the efficiency savings associated with this adaptation of the method of the second aspect of the invention.

The method of the second aspect of the invention, used in conjunction with the database of the first aspect of the invention may be particularly advantageous in the monitoring of banking operations, such as money transfers, and particularly in the detection of aberrant activity.

Salient modes of fraud can be performed over longer periods of time using actions which are small in magnitude and long in terms of time period in order to hide amongst normal activity. Using the method of the second aspect of the invention, in conjunction with the database of the first aspect of the invention allows multiple mean averages to be monitored to detect any relative changes which may give evidence towards fraud.

For example, the mean of transfers over the past five hours equaling the mean of the last hour could indicate normal activity, while any rise in the last hour's mean value would indicate possible fraud. Since we do not know the exact parameters or combinations of mean averages to monitor beforehand, a wide range of values must be explored. The ability to respond to different requests quickly and easily greatly facilitates this process. This approach can also be applied to different detection applications, e.g. exchange surveillance, which search for atypical activity based on historical determination of normal activity.

As an extension to this application, many different sized mean averages could be monitored in parallel and in real-time. As mentioned, historical experimental evaluation of alternative mean sizes can also be performed easily and efficiently. These are both direct consequences of having cost-effective operations using the method of the second aspect of the invention in conjunction with the database of the first aspect of the invention.

In general, in a database that is configured to store large amounts of data (over 1000 records and generally over 10,000 records), it is difficult for the user to access individual records.

In general, the user of a database is primarily interested in the most recent records of the database.

Therefore, in a third aspect, the present invention may provide a computer-implemented method of compiling a database at a time t, for storing previous values of a time-dependent variable, including the step of selecting a set of values of the time-dependent variable corresponding to a sequence of pre-determined time intervals measured back from time t.

The database may be a database according to the first aspect of the present invention, but this is not essential.

Typically, the time intervals for recently-entered records are more closely-spaced than the time intervals for older records. As a result, the database stores recent data with a high granularity, while more remote data is stored with a low granularity.

In the case of e.g. a highly liquid financial market having high levels of data throughput per second, the database of the third aspect of the invention can be used to reduce the amount of data stored and subsequently sent to users. Intuitively, if a user is using this data at the millisecond level, his main interest will be in the most recent data, while a user who is interested in longer time periods (i.e. minutes, hours) will generally not require millisecond data precision. Therefore, the third aspect of the invention allows for handling of different client requests according to their needs (and/or constraints) in a more efficient manner. This reduces the total data sent by only sending what the user requires, thereby resulting in lower required network bandwidth and storage costs.

In general, a database that is configured to store multiple inter-related sequences of data (such as, but not only, the database of the first aspect of the invention) will be subjected to sorting operations to monitor relative changes in the stored data. For example, the database may store specific market indicators for a set of financial instruments, and the data may be sorted according to the relative values of the market indicators. As the values of the market indicators change, further sorting operations will be required to update the database.

Similarly, when a database is used to determine the extent of pattern matching between e.g. a recent data sequence and a historical data sequence the different matching results may be sorted to find e.g. the historical sequence that is the best match for the recent sequence. (Such pattern matching may be carried out using the database of the first aspect of the invention in conjunction with the method of the second aspect of the invention, but conventional databases and methods may also be used).

However, such sorting operations may be expensive in terms of computational cost. Therefore, in a fourth aspect, the present invention may provide a computer-implemented method of sorting a dataset according to a predetermined sort criterion, comprising the steps of:

traversing the dataset to determine if any values of the dataset are out of order according to the predetermined sort criterion, and optionally sorting the dataset according to the predetermined criterion, if any values of the dataset are out of order.

Thus, the computational cost of sorting the database is only incurred when the values of the dataset are out of order. If the values of the dataset are in order, the only cost that arises is the cost of traversing the data to determine this.

This method is particularly effective in cases where the data (e.g. market indicators for financial instruments) has low volatility. In this case, sorting operations will rarely be required, and so use of the method may allow unnecessary sorting operations to be avoided, thus reducing overall computational cost.

In particular, this method will be effective when the values of the dataset that determine the sort order (e.g. the market indicators of financial instruments) are calculated values determined as a function of a plurality of measured data values. Such calculated values typically have low volatility as they are relatively insensitive to changes in a single measured data value. This is especially the case if the values are calculated from data that is accumulated over long time periods.

Such calculated values may be any one of the following:
a) an average value of the measured data values;
b) the sum of the measured data values;
c) the maximum or minimum of the measured data values; or
d) the standard deviation of the measured data values.

Application Areas

The invention is beneficial to applications that have data streams arriving continuously in a rapid manner with time-varying and unpredictable lengths. Traditional DBMS approaches with their limited memory are unsuitable for such applications which require rapid and continuous loading of data in addition to continuous querying and processing [M. Kontaki, A. N. Papadopoulos and Y. Manolopoulos, Adaptive similarity search in streaming time series with sliding windows, *Data & Knowledge Engineering*, Volume 63, Issue 2, (November 2007), Pages: 478-502]. An additional difficulty when attempting to perform standard analytic analysis to such data is the inability to obtain random access due to the continuous and unpredictable behavior of the data streams, which are only readable once or a limited number of times [P. Tsai, Mining top-k frequent closed itemsets over data streams using the sliding window model, Expert Systems with Applications: An International Journal, Volume 37, Issue 10, (October 2010), Pages: 6968-6973]. This requires modified analytic methods which provide fast answers to range queries that do not require multiple data scans.

Query Types

The invention mechanism is capable of performing the following query types that are required for continuous data applications [F. Buccafurri and G. Lax, Approximating sliding windows by cyclic tree-like histograms for efficient range queries, *Data & Knowledge Engineering*, Volume 69, Issue 9 (September 2010), Pages: 979-997]:
1. Point query: return the k-th data point of the data stream
2. Range query: return aggregate data within given time interval
3. Similarity query: return true whether a similar pattern occurs in the data stream [P. Capitani and P. Ciaccia, Warping the time on data streams, *Data & Knowledge Engineering*, Volume 62, Issue 3 (September 2007), Pages: 438-458]

Application Examples

Financial

Market Transparency

There is an increasing demand on financial market authorities to ensure their participants that their markets are fair and transparent. As trading volumes increase (hundreds of gigabytes per day in some markets), it becomes increasingly difficult to disseminate the data to all the participants. Only institutional and big investors can afford to have full access to such data. This by itself makes transparency a big issue when it comes to retail investors who cannot afford to receive such huge data. The difficulty is compounded when not only transactional data is required, but also more sophisticated data such as order movement and non-traditional execution information also becomes a necessity. What the invention allows for is the ability to present accurate aggregate data to all the participants upon which they can select their desired data using the customizable window sizes mechanism. This offers several advantages, first, computations are performed only once when storing the cumulative data. The user then requests the desired data range and receives only the start and end data elements which enable completion of the request. This results in a massive computational savings, especially with an increased number of users/requests since the upper bound on computation has been capped during data generation. Second, sending the user only the limits of the desired data range results in a huge reduction in bandwidth effectively placing a cap on the communications cost regardless of the data range request. Third, the ability to extract custom data ranges with no significant computational or bandwidth overhead allows for large amounts of simultaneous real-time analysis and experimentation. Fourth, allowing the participants to perform all their data queries without having to deliver the entire data range helps to protect the authorities' data from unlawful usage or transfer. Finally, the invention provides a means for making the market fully transparent to all participants at the aggregational level, without disclosing all individual data ticks which are usually sold at high prices.

Telecommunications

Network Traffic Monitoring

Optimization of network utilization relies on the management of router and switch queues [E. Hernandez-Orallo and J. Vila-Carbo, Network queue and loss analysis using histogram-based traffic models, *Computer Communications*, Volume 33, Issue 2 (February 2010), Pages: 190-201], [S. K. Tanbeer, C. F. Ahmed, B. Jeong and Y. Lee, Sliding window-based frequent pattern mining over data streams, *Information Sciences*, Volume 179, Issue 227, November 2009, Pages 3843-3865]. In general, modeling a network consists of feeding traffic into finite sized queues at given service rates with the goal of determining information about queue utilization. Custom distributions and models are then used to model such traffic thus requiring the continuous determination of mean and volatility values. With increasingly larger networks, the amount of data generated and consequent computations increases, making it more difficult to tailor reports to individual user needs. The invention can make three major contributions to this problem:
1. Currently fixed period monitoring reports (e.g. updated every 24 hours) are sent to users, this is due to the difficulty in constructing custom reports for each user based on their individual requirements. The invention allows for pre-computation and storage of data that can then be used by users to make their own custom reports, thereby alleviating the need for custom computation on a per-user level.
2. Statistical computations are easily transformable into cumulative computations and this allows for minimizing the amount of data and bandwidth usage per user request since only the end point data items of the required range need to be sent.
3. Increased data security for the provider since only data pertinent for the user request is sent rather than the entire data set.

Intrusion Detection

Information in data servers must be protected from network borne attacks [H. Li and S. Lee, Mining frequent itemsets over data streams using efficient window sliding techniques, *Expert Systems with Applications*, Volume 36, Issue 2, Part 1, March 2009, Pages 1466-1477], [W. Wang, X. Guan and X. Zhang, Processing of massive audit streams for real-time anomaly intrusion detection, *Computer Communications*, Volume 31, Issue 1 (January 2008), Pages: 58-72]. The two basic approaches consist of signature based detection where malicious behavior is detected by matching against previously stored prototypical attacks and anomaly detection where the profile of a normal user is maintained and an attempt is made to identify unacceptable deviation as a possible attack. The signature based approach can be adapted to make use of the invention's distance measurement mechanism where distances to a predefined set of signatures are recorded in real-time. The unique advantage of the invention is that not only distances to the complete signature are obtainable, but also distances to signature subsets are possible. This allows for quick experimentation and testing capabilities that do not require time consuming distance re-computation. Anomaly detection also benefits from the ability to perform calculations over data subsets. This is especially suitable for automated calibration approaches where multiple time periods can be measured simultaneously with no additional computation and vastly reduced bandwidth costs compared to a conventional approach.

Engineering

Concrete Structures

Monitoring technology is used to track the performance of mass damping systems for tall concrete structures to enhance their damping and maintain their safety [J. M. W. Brownjohn, E. P. Carden, C. R. Goddard and G. Oudin, Real time performance monitoring of tuned mass damper system for a 183 m reinforced concrete chimney. *Journal of Wind Engineering and Industrial Aerodynamics* Vol. 8, No. 3, March 2010, pp. 169-179]. Accelerometers are connected to the structure and remotely monitored to provide real-time information to determine whether the structures displacement exceeds critical thresholds. A large-scale application of this monitoring technology over hundreds or even thousands of structures would require a unified data management system such as the invention in order to allow all users to perform their required monitoring tasks simultaneously. With the compute-once, use-by-many approach, it is possible to efficiently have many automated systems monitoring different phenomena simultaneously through the use of different sized windows and data combinations. In addition, the low bandwidth requirement resulting from the cumulative data storage structure means that the monitoring sites can be remotely located with little overhead communications cost.

Drilling Optimization

The goal is to optimize the drilling process to minimize cost while maintaining operational safety standards. This is done by continuously assessing the drilling process throughout the operation such that the overall rate of penetration is maximized based on cumulative footage drilled. The basic decision that must be made is to compromise between maximizing the utilization of the drill head and minimizing project down time due to a damaged drill head and the associated lead time to replace and order new parts. This is performed by continuously analyzing several variables such as weight on bit and rotary speed, applying such data to mathematical models and making a decision as late as possible to maximize bit head usage while not endangering progress of the drilling project. An advantage of a solution based on the invention is that time windows can be customized at any time with a negligible computational penalty. This is important when drilling through different geological formations, varying the drilling speed or even real-time calibration of models as work progresses and ensures the ability to perform comprehensive analysis regardless of the initial strategy. This also allows for evaluating several different models simultaneously using the same initial data. In addition, the low bandwidth requirement is an important feature especially when drilling in harsh remote areas where it is difficult to locate analysts and acquiring large bandwidth communication channels is often cost prohibitive.

Scientific Data Analysis

Earthquake Prediction

Early warning devices can provide a short warning before the arrival of major tremors based on the different propagation speeds of the various vibrations produced. This application is distinguished by large amounts of continuous data that need near instantaneous processing in order to be of value. Measurement centers can also make use of readings from neighboring centers in their effort to increase the detection time before an earthquake. Due to the large amount of data generated by each measurement device, this is prohibitively expensive for all but the largest centers. However, with the use of the invention as the data storage backbone, hundreds or even thousands of neighboring centers can share data making use of the low bandwidth requirement of the invention. In addition, the negligible calculation overhead for different sliding window sizes means that multiple levels of detection can be simultaneously performed in order to detect different size anomalies. This is important for experimentation since a large number of potential models can be simultaneously machine tested and potentially applied.

Tropical Atmosphere Ocean

In-situ environmental sensors are physically located in the environment they are monitoring and their time-series data is transmitted continuously to a single data repository [D. J. Hill and B. S. Minsker, Anomaly detection in streaming environmental sensor data: A data-driven modeling approach, *Environmental Modelling & Software*, Volume 25, Issue 9, September 2010, Pages 1014-1022]. There is a need for automated data quality assurance and control to detect and identify anomalous data that deviates significantly from historical patterns. Such anomaly detection can also be used in the field of adaptive monitoring where anomalous data indicates phenomena that may require further investigation. The invention can be used as the main data depository where the customizable sliding windows mechanism can be used to perform simultaneous data assurance tests, thereby adding an additional layer of sophistication for quality monitoring. In addition, the same mechanism can be used to simultaneously detect multiple abnormal phenomena or allow for straight forward changes in detection strategy with a no additional computational cost. An added advantage is the ability to serve other remote users with their data requests with only a minimal communications investment due to the low bandwidth data transmission mechanism.

DETAILED DESCRIPTION

The following explanation and examples 1-8 demonstrate how a database according to the first aspect of the invention may be constructed and used to store data and provide information in response to user queries.

In a first embodiment, a database is provided to store a sequence of time values. Each time value has associated with it one of a sequence of values of a variable y. The variable y may be, e.g. a variable describing a financial transaction, such as price or volume.

The time values are arranged in sequence from the earliest time value to the most recent value, and the values are evenly spaced. For example, the difference between consecutive time values may be 0.5 s, 0.1 s, or 0.05 s.

The database is configured to store over 1000 such time values.

In a first embodiment, the database also stores the cumulative value of the y variable, i.e. the sum of the y variables corresponding to the time span from the first time value to the nth time value $$\left[\sum_{1}^{n} y\right].$$

Therefore, each time value n has associated with it the sum of the y variables recorded from the earliest time value to this more recent time value.

This allows the total quantity of variable y corresponding to the time period between time a and time b (i.e.

$$\sum_{a}^{b} y)$$

to be calculated by subtracting $\Sigma y$ at time (a) from $\Sigma y$ at time (b).

Thus, the user is able to calculate the cumulative total of variable y added to the database in a given time period by retrieving two data points $\Sigma y(a)$ and $\Sigma y(b)$ from the database and performing a single operation to subtract one value from the other.

To calculate the mean average of the variable y in the time period between time a and time b, it is necessary to subtract $\Sigma y(a)$ from $\Sigma y(b)$ and to divide the result by the number of values in the subsequence extending from time a to time b. Thus, the user has to perform a single subtraction operation and a single division operation.

In a comparative example, using a conventional database, the calculation of the cumulative total of variable y added to the database in a given time period would require all values of the variable y added to the database in that time period to be retrieved from the database and added to each other.

Similarly, in another comparative example, the mean average of values stored in a conventional database is calculated by retrieving all those values, adding them to each other and dividing by the total number of values.

In other embodiments of the first aspect of the invention, the database may store the cumulative value of a function of the variable $y_n$ for each time period between 1 and n. For example, the database may store the cumulative value of $y^2$. This allows, for example, the variance of the variable y to be calculated using the following formula $$\underline{\text{Variance}} = \left(\sum_{a}^{b}(y^2) - \sum_{a}^{b}(y)^2\right) \Big/ n$$

Therefore, the variance of the variable y in the time period from time a to time b may be calculated by retrieving four values from the database: $\Sigma(y^2)$ and $\Sigma(y)$ for time=a, $\Sigma(y^2)$ and $\Sigma(y)$ for time=b.

In another embodiment of the invention, the database stores a sequence of further input variables y', each value of y' being associated with one time value in the sequence of time values.

In this case, the further input variables y' may be stored in the database in the form of the cumulative value of [y'·y]. That is, the database stores the cumulative total of [y'·y] for each time value from the earliest time value to the nth time value:

$$\left[\sum_{1}^{n} y' \cdot y\right].$$

This allows the correlation of the variables y and y' over the time period of interest between time a and b to be calculated using the formula:

$$\text{Correlation} = \frac{(b-a)\left(\sum_{1}^{b} y' \cdot y - \sum_{1}^{a} y' \cdot y\right) - \left(\sum_{1}^{b} y' - \sum_{1}^{a} y'\right)\left(\sum_{1}^{b} y - \sum_{1}^{a} y\right)}{\sqrt{(b-a)\left(\sum_{1}^{b} y'^2 - \sum_{1}^{a} y'^2\right) - \left(\left(\sum_{1}^{b} y'\right)^2 - \left(\sum_{1}^{a} y'\right)^2\right)} \cdot \sqrt{(b-a)\left(\sum_{1}^{b} y^2 - \sum_{1}^{a} y^2\right) - \left(\left(\sum_{1}^{b} y\right)^2 - \left(\sum_{1}^{a} y\right)^2\right)}}$$

Example 1

Data Storage

Taking the database of the first embodiment of first aspect of the invention, in which a cumulative value of the y variable is stored, the costs of building the database are set out below (compared to a comparative example for a conventional database):

Cost of adding a new record=computational cost of adding new record to sum of all previous records+storage cost for storing new cumulative record.

For conventional database, cost of adding a new record=storage cost for storing one more record (no computation cost)

The storage cost is the cost of sending the record to the network memory (including the use of network bandwidth).

The computational cost is the cost of the mathematical manipulation into the desired format.

Therefore, data storage in the first embodiment of the present invention has associated with it the additional computational cost (relative to the comparative example of a conventional database) of adding the new record to the sum of all the previous records. The storage costs for the first embodiment may be marginally higher than those associated with a conventional database, due to the larger size of the cumulative values compared to raw data. For example, a two digit number (e.g. a raw data value) if held constant and accumulated for 100 seconds would result in a four digit number to the stored in the database.

Example 2

Data Manipulation

In this example, the mean average of a series of data records is calculated from the database of the first embodiment of the first aspect of the invention.
This requires the steps of:
1. retrieving data records from the start and end of the series (retrieval cost=two fetch operations)
2. subtracting start record value from end record value (computational cost=one subtraction operation)
3. performing division by size of data (computation cost=one division operation)

In a conventional database, this process would require the steps of:
1. retrieving all data records in the series of interest (retrieval cost=n fetch operations)
2. performing summation over all retrieved records (computation cost=(n−1) addition operations)
3. performing division by size of data (computational cost=one division operation)

Therefore, the database of the first embodiment of first aspect of the present invention has significantly lower retrieval costs when calculating a mean average of stored data, as well as lower computational costs at the time of performing the calculation. In general, these lower costs of data manipulation will tend to offset the slightly higher one-off costs associated with data storage. This is particularly the case if the request is continuously repeated. For example, if the database of the first embodiment of the invention is queried to obtain the mean of the last 100 data records, and to update this value each time a new record is entered, the realised computational and retrieval savings overcome the costs of the pre-computation overhead after calculating the first mean value, as compared to the conventional method. In addition, if the request was modified to cover the mean of the last 200 data records, the cost would not increase.

Example 3

Calculation of the Volume Weighted Average Price

The volume weighted average price (vwap) of a stock is obtained by dividing the total transacted money value by the total transacted volume. The money value of a transaction is the volume of the transaction multiplied by the price.

In a database according to a second embodiment of the first aspect of the present invention, the cumulative volume and the money value (the multiple of volume and price) are stored as a function of time. In this case, the vwap may be calculated by following the steps of:
1. retrieving money value records from the start and end of the series of interest (retrieval cost=two fetch operations)
2. subtracting start record from end record (computational cost=one subtraction operation)
3. retrieving volume records from the start and end of the series of interest (retrieval cost=two fetch operations)
4. subtracting start record from end record (computational cost=one subtraction operation)
5. dividing the value obtained in step 2 by the value obtained in step 4 (computational cost=one division operation)

Therefore the total cost of calculating the vwap is four fetch operations, two subtraction operations and one division operation.

In a conventional database, this process would require the steps of:
1. retrieving all money value records in the series of interest
2. performing a summation of all of the records obtained in step 1
3. retrieving all volume'data records in the series of interest
4. performing a summation of all the records obtained in step 3
5. dividing the value obtained in step 2 by the value obtained in step 4.

Therefore, as a comparative example, the total data cost of calculating the vwap using a conventional database is 2×n fetch operations (where n is the number of values in the data series of interest), 2×(n−1) addition operations and one division operation.

Example 4

Pattern Matching

In a third embodiment, the database of the first aspect of the invention has six time periods, each time period having a sequence of five records, labelled 1-5. The database is configured to store the Euclidean distance between corresponding records from different time periods. The Euclidean distance is stored in cumulative form, according to the following formula:

$$\text{Cumulative Euclidean distance: } \sqrt{\sum_{1}^{n}(TA_r - TB_r)^2}$$

where r=the number of the record and TA is a first time period and TB is a second time period.

Thus, the database stores the Euclidean distance between the $1^{st}$ record in each of time period TA and time period TB. The database also stores the sum of the Euclidean distance between the $1^{st}$ record in each of time period TA and TB and the second record in each of these time periods. Similarly, the database also stores further cumulative values covering the $1^{st}$-$3^{rd}$ records, the $1^{st}$-$4^{th}$ records and the $1^{st}$-$5^{th}$ records in these time periods.

Similarly, the database also stores cumulative distance values corresponding to the distance between corresponding records of other time periods.

The Euclidean distance between corresponding subsequences of records in different time periods is given by the following formula:

$$\text{Euclidean distance} = \sqrt{\sum_{1}^{q}(TA_r - TB_r)^2 - \sum_{1}^{p}(TA_r - TB_r)^2}$$

where the subsequence extends between records p and q.

Therefore, the Euclidean distance between two corresponding subsequences in different time periods may be rapidly calculated from the stored cumulative distance values. The cumulative distance values are stored in the database and may be re-used in response to subsequent requests.

Thus, the operations that must be carried out in response to a request for the distance between two corresponding subsequences in different time periods are:
1. Fetch cumulative distance values corresponding to the start and end of the subsequence of interest and the two time periods of interest
2. subtract the cumulative value at the start of the subsequence from the cumulative value at the end of the subsequence.
3. calculate the square root of the difference between the two cumulative values.

By contrast, in a comparative example using a conventional database, the distance between two subsequences is calculated directly in response to the user request, from the raw data stored in the database. Thus, the operations that have to be carried out in response to the user request are:
1. Fetch 2n records (where n is the length of the subsequence)
2. n subtraction operations (performed with corresponding records from sub sequences in different time periods)
3. n multiplication operations (to calculate the squares of the differences)
4. (n−1) addition operations
5. one square root operation Thus, the present example provides a significant saving in terms of data retrieval and computation cost incurred in response to a user request, compared with the comparative example of a conventional database. These savings will increase with the length of the subsequence of interest.

Using this embodiment of the first aspect of the invention, pattern matching may be performed between a time period of interest (typically a recent time period) and other, more distant time periods, in order to find the historical time period that is the best match for the time period of interest.

In this case, the Euclidean distance is calculated between the subsequence of interest and the corresponding subsequences in each of the historical periods of interest. A sorting operation is then performed to identify the historical data subsequences that have the lowest Euclidean distance from the subsequence at the time period of interest.

It is clear that in this embodiment of the first aspect of the invention, a substantial number of operations have to be performed upon insertion of data into the database, to calculate and store the cumulative Euclidean distance. However, since this stored data can be re-used, the overhead per request will diminish as the number of requests grows.

Example 5

Data Pre-Fetching

In general, data requests carried out using the method of the second aspect of the invention consist of fetching the start and end of the required period of data. When a fetch process is expensive due to latency (such as when accessing a database or fetching over a network) it may be advantageous to pre-fetch data in order to eliminate the latency overhead for additional fetch operations and to make use of temporal locality during caching.

This example will demonstrate the pre-fetching concept with the following scenario. We are performing a continuous real-time request and are currently at time 105. The request consists of fetching both the start and end of the ten most recent cumulative values as the database is updated, e.g. to allow the mean average of the 10 most recent measured values to be calculated.

In an embodiment of the method according to the second aspect of the invention, at the time of fetching from database A the first end cumulative value (corresponding to time 96), all the cumulative values up to e.g. the cumulative value corresponding to time 100 are also fetched and stored in a local cache B. The cumulative values are retrieved from the cache as required, for use in responding to subsequent requests, as the database is updated with cumulative values for time 106, 107 etc.

The cost of retrieving a cumulative value from database A is α, while the cost of retrieving a cumulative value from the cache B is β.

The cost of the fetching/retrieval operations for responding to successive requests each time the database is updated is therefore given by the following Table:

| Request | Retrieval requirements | latency cost |
| --- | --- | --- |
| Mean average from time 96-105 | Fetch cumulative value for time 105 from database A; fetch cumulative values for times 96-100 from database A (and store in cache B); fetch cumulative value for time 96 from cache B | $2 \times \alpha + \beta$ |
| Mean average from time 97-106 | Fetch cumulative value for time 106 from database A; fetch cumulative value for time 97 from cache B | $\alpha + \beta$ |
| Mean average from time 98-107 | Fetch cumulative value for time 107 from database A; fetch cumulative value for time 98 from cache B | $\alpha + \beta$ |
| Mean average from time 99-108 | Fetch cumulative value for time 108 from database A; fetch cumulative value for time 99 from cache B | $\alpha + \beta$ |
| Mean average from time 100-109 | Fetch cumulative value for time 109 from database A; fetch cumulative value for time 100 from cache B | $\alpha + \beta$ |

This Table shows how when the first request is received, the cumulative values for time 96-100 are fetched from database A at a cost of $\alpha$ and stored in cache B. Cumulative value 96 is then fetched from cache B at a cost $\beta$ and cumulative value 105 is fetched from database A at a cost $\alpha$. The two cumulative values are used in this case to calculate the mean average of the measured records from time 96 to 105.

The next calculation is performed after the database has been updated to include the most recent cumulative value for time 106. This value is retrieved from database A at a cost of $\alpha$ and the end value 97 is retrieved from the cache B at a cost $\beta$.

This process is repeated until there are no more values stored in the cache, or until no more user requests for calculation are received.

In this example, the total retrieval or fetching cost for providing the start and end values of the sequence as the database is updated is given by $6\alpha+5\beta$.

By contrast, if the method of the second aspect of the invention is not adapted in this way, the total retrieval cost for fetching the start and end values of five sequences is $10\alpha$ (i.e. each of the 10 start and end values has to be fetched from the database A).

Assuming that the latency cost a for fetching data from the database is significantly greater than the latency cost $\beta$ for fetching data from the cache, then such pre-fetching greatly reduces the overall latency cost in responding to successive requests.

Example 6

Construction of a Database of Varying Granularity

In this embodiment of the third aspect of the invention, all data received is stored in a primary database. A secondary database is also constructed, which stores records corresponding to pre-determined time intervals measured back from either:
(i) the time of the most recent update of the database, or
(ii) the present time.

If the time intervals are measured back from the time of the most recent update, the secondary database is updated every time a new record is entered. If the time intervals are measured back from the present time, the secondary database is updated e.g. every second.

Thus, in one example, the secondary database stores records from 5 seconds, 30 seconds, 5 minutes, 30 minutes and 2 hours before the most recent update. In this way, the secondary database stores more records relating to recent data and fewer records relating to past data, i.e. the granularity of the database is greater for recent data than for past data.

A possible structure for the secondary database is that a pre-defined percentage of data is provided at high granularity, while the rest is at low granularity. For example, referring to data taken from a total time period of 600 minutes (10 hours), the data recorded in that period may be stored as set out in the following Table:

| Time period extending back from present time | Granularity |
| --- | --- |
| 0-0.5 s | milliseconds |
| 0.5-5 s | Half seconds |
| 5-90 s | Seconds |
| 90 s-30 minutes | Half minutes |
| 30 minutes-10 hours | minutes |

In this example, the storage space required for the secondary database is only approximately 5% that required for the primary database, in which all the data is stored at a granularity of milliseconds.

Example 7

Conditional Sorting

In this example, a database stores data relating to financial instruments e.g. market indicators for each instrument. The data is sorted according to the values of the market indicators. As the market indicators are updated, the data values become out of order, and so re-sorting of the database is required.

According to this embodiment of the fourth aspect of the invention, sorting of the data is carried out according to the following algorithm:

for i=2 to n
if x[i]<x[i−1]
sort_instruments
return where i is a financial instrument and x[i] is a market indicator for that instrument.

Thus, re-sorting of the database is only carried out when the financial instruments are out of order according to their market indicators. The computational cost of the re-sorting operation is limited to cases where the data is out of order, and otherwise, only the cost of traversing the data is incurred.

For example, a database may be configured to store a market indicator relating to 10 financial instruments. The market indicator is updated every second, but the data is sorted on the basis of the 5 minute mean average of the market indicator. In this case, the database will be traversed every second (when the market indicator is updated) to determine if the values are still in order, and the data will only be re-sorted if the values are out of order. Due to the low volatility of the 5 minutes mean average, the data will rarely need re-sorting and so the computational costs relating to the sort operation will be reduced.

Empirically, it has been found that the overall computational costs of running the database can be reduced by up to 50% when using the conditional sorting algorithm, as compared to a conventional sorting operation, where sorting is carried out each time the values in the database are updated.

Example 8

Market Indicators

A database according to the first aspect of the invention may be used to generate descriptive financial indicators obtained by synthesising a complete order book from generally-available raw data.

In this example, the database is used to provide the following data types for use in generating typical financial indicators: money value, volume, trades, price, return, return squared, return times index. An advantage of the database of this example is that it may also be used to provide other non-typical variables extracted from both the executed trades and order book updates, which have conventionally been of low interest due to their large number and insignificance on their own. However, the aggregate nature of the database where these variables may be represented using statistical measures over periods of time may provide meaningful insights that could not have been achieved by looking at the variables individually. Typical variables may be subjected to detailed decompositions such as decomposing executed trades into: normal/hidden/exception executed buy/sell trades. Order book changes may be used to decompose pending orders into: added/removed orders to the ask/bid side for each individual order book price level or any combination therein. The trades/orders decomposition may then used to specify the non-typical financial indicators.

The process of synthesising the order book is set out below.

Synthesis of Level III (Complete Order Book) Using Level II Updates

Normally Level III is available only to market makers and specialists. However, using the following approach this data can be synthesized using more generally available level II data messages.

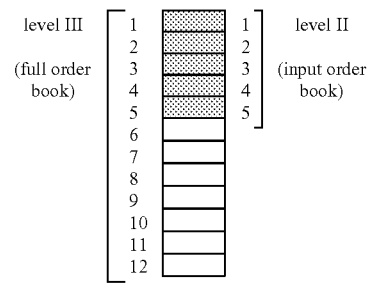

Message Format

The following data fields are assumed to be available as input to the synthesis process and represent the minimal amount of information required to generate the financial indicators contained within this document.

| type (transaction/order book movement) | symbol | price | volume | sequence |
| --- | --- | --- | --- | --- |

Support Data Structures

| | | description | usage |
| --- | --- | --- | --- |
| tables | fullOB_table | Represents the latest simulated order book containing all possible price levels | contains the latest level III order book |
| | tempOB_table | Represents the updated simulated order book containing all possible price levels | internally used only |
| | inputOB_table | Represents the actual order book containing only the top (usually 5-10) price levels | contains the latest level II order book |
| | inputTR_table | Represents the latest transaction received | contains the transaction |
| lists | change_list | Represents the individual changes affecting the input order book | process log used as source for financial indicators |
| pointers | fullOB_pointer | Pointer to fullOB_table price level (initially points to first element) | internally used only |
| | inputOB_pointer | Pointer to inputOB_table price level (initially points to first element) | internally used only |
| | level2_size | usually 5 or 10 depending on exchange | input parameter |

All tables (except for inputTR_table) and lists exist for both bid and ask sides.

The process consists of maintaining a set of tables and lists for the full order book as a result of synthesizing the input order book which is filled by using market messages.

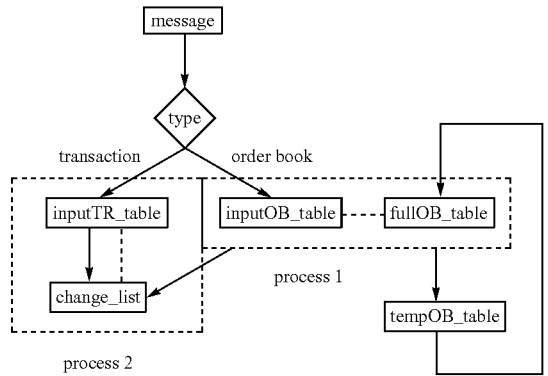

Process 1

This process is started upon classification of the input message as an order book movement. It consists of incorporating the message into the latest inputOB_table (level II), comparison to the latest fullOB_table (level III), generation of the new tempOB_table (level III) and the change list. The tempOB_table then becomes the latest fullOB_table and the change list becomes available for transaction messages.

The following four step algorithm is executed to compare between the inputOB_table and the fullOB_table and perform any needed modifications. Note that all steps of the algorithm are applicable to either ask/bid tables/lists depending on the initial price match. Subsequent modifications to tables/lists/pointers are done for the matching side.

Deleted Price
Latest message indicates that old price level has been deleted from order book.
Status price(fullOB_table, fullOB_pointer) > price(inputOB_table, inputOB_pointer) (bid side)
price(fullOB_table, fullOB_pointer) < price(inputOB_table, inputOB_pointer) (ask side)
    or
inputOB_pointer → end and inputOB_pointer < level2_size Update append   [price(fullOB_table, fullOB_pointer), -vol(fullOB_table, fullOB_pointer)] to change_list
increment   fullOB_pointer Added Price
Latest message indicates that a new price level has been added to the order book.
Status price(fullOB_table, fullOB_pointer) < price(inputOB_table, inputOB_pointer) (bid side)
price(fullOB_table, fullOB_pointer) > price(inputOB_table, inputOB_pointer) (ask side)
    or
fullOB_pointer → end (or empty)

Update append   [price(inputOB_table, inputOB_pointer), vol(inputOB_table, inputOB_pointer)] to tempOB_list
append   [price(inputOB_table, inputOB_pointer), vol(inputOB_table, inputOB_pointer)] to change_list
increment   inputOB_pointer Same Price
Latest message has no effect on this current price level in the order book
Status
    price(fullOB_table, fullOB_pointer)=price(inputOB_table, inputOB_pointer)
Update append   [price(inputOB_table,inputOB_pointer),vol(inputOB_table, inputOB_pointer)] to tempOB_list
append   [price(inputOB_table, inputOB_pointer), Δvol(inputOB_table, inputOB_pointer)] to change_list
increment   fullOB_pointer
increment   inputOB_pointer update market status to "open" if both pointers point to top prices of the order book tables
Price Shifted Down
Price level which is now lower than level2_size
Status
inputOB_pointer>level2_size
Update append   [price(fullOB_table, fullOB_pointer), vol(fullOB_table, fullOB_pointer)] to tempOB_list
increment   fullOB_pointer Price levels may change when they move beyond the level 2 size limits, therefore upon their return they may not be completely accurate.

Process 2

This process is started upon classification of the input message as a transaction. It will convert the input message to an inputTR_table and perform matches and modifications to the latest change_list. The change_list is thus a summary of all transactions and order book movements and is the main source of input for generation of the financial indicators The algorithm consists of matching the inputTR_table to find the closest match in the change_list in terms of sequence number in addition to other status requirements mentioned below. Note that all steps of the algorithm are applicable to either ask/bid lists depending on the initial price match. Subsequent modifications to /lists are done for the matching side.
Normal
    Status vol(inputTR_table) = vol(change_list)
price(inputTR_table) = price(change_list)

-continued

> or
> market status = open

Update
mark (price, vol) in change_list as a normal transaction
If market status is open, determine the minimum bid/ask quantity at the top level then loop and mark all transactions until the sum of transactions is equivalent to the minimum quantity.
Hidden
   Status > price(inputTR_table) = price(change_list)
> vol(inputTR_table) > vol(change_list)

Update
  mark (price, vol) in change_list as a hidden transaction
Unclassified
   Status > price(inputTR_table) = price(change_list)
> vol(inputTR_table) < vol(change_list)

Update
  mark (price, vol) in change_list as a hidden transaction

Note that there is a delay in determining whether an order book movement is a transaction, since we must wait until the transaction message is received before the status of the movement can be determined. This is a direct result of the manner in which the exchange processes such information.

Descriptive Financial Indicators

Financial indicators are three-tuples composed of {data type, action, action type}. The following tables briefly describe what each of these tuples represent. Note that order can represent a traded order (executed) or a pending order (waiting in order book).

| data type | | storage |
|---|---|---|
| money value | sum of price times volume of orders | cumulative |
| volume | sum of volume of orders | cumulative |
| trades | sum of number of orders | cumulative |
| price | volume weighted average price of orders | cumulative |
| return | $(price_t - price_{t-1})/price_{t-1}$ | cumulative |
| return squared | return times return | cumulative |
| return times index | return times return of index | cumulative |

| | | | action | |
|---|---|---|---|---|
| traded | order has been executed | normal | trade which matches a price and quantity from the current order book | |
| | | hidden | non matching trade from either side of order book, whose size is larger than what is available | |
| | | exception | non matching trade from either side of order book, whose size is smaller than what is available | |
| pending | order is still pending in order book | all | sum of added and removed quantities to order book resulting in current state of order book | |
| | | added | added quantities to order book | |
| | | removed | removed quantities from order book | |

| | action type | |
|---|---|---|
| all | all orders whether buy or sell | |
| buy (bid) | only buy orders (from bid side only if pending orders) | |
| sell (ask) | only sell orders (from ask side only if pending orders) | |

Data types consist of all orders for a single instrument within a specific period of time that satisfy the following selection criteria depending on the desired action and action type:

| | | | action type | | |
|---|---|---|---|---|---|
| | | | all | buy | sell |
| action | traded | normal | executed trades | executed buy trades | executed sell trades |
| | | hidden | executed trades which exceed those from the order book | executed buy trades which exceed those from the order book | executed sell trades which exceed those from the order book |
| | | exception | executed trades which are less than those from the order book | executed buy trades which are less than those from the order book | executed sell trades which are less than those from the order book |

-continued

|  |  | action type | | |
|---|---|---|---|---|
|  |  | all | buy | sell |
| pending | all | pending trades in both sides of order book | pending buy trades in bid side of order book | pending sell trades in ask side of order book |
|  | added | pending trades which have been added to both sides of order book | pending buy trades which have been added to bid side of order book | pending sell trades which have been added to ask side of order book |
|  | removed | pending trades which have been removed from both sides of order book | pending buy trades which have been removed from bid side of order book | pending sell trades which have been removed from ask side of order book |

As an example, {money value, pending, bid} would represent the sum of price times volume of all orders for a specific instrument which are still pending in the bid side of the order book and represent waiting buy orders.

Accumulation of changes that occur within a period of time (e.g. one second) and summarizing them using the aforementioned financial indicators is advantageous since a typical user viewing such data would not be able to monitor changes that occur in sub-second real-time in any case. It also results in a large decrease in the data cost upon delivery to the user (such a cost can be an I/O cost in addition to a bandwidth cost).

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. An intrusion detection method for distributing customizable functions of data, the customizable functions of data including matching subsequences by measuring distances between corresponding records of two individual subsequences over a network to a remote subscriber computer, the method comprising:
receiving data at a transmission server sent from a data source over the Internet, the transmission server comprising a processor and memory that stores the remote subscriber's address and receives in real-time the remote subscriber's requested function of data;
formatting the incoming data into:
a sequence of first input values $x_n$ wherein n=1, 2, . . . i, wherein for any value of n, $x_n$ lies between $x_{n+1}$ and $x_{n-1}$ in the sequence, and has associated with it:
a second input value $y_n$;
a conversion value $p_n$ that is calculated from $y_n$ according to a conversion algorithm using at least one of the one or more processors, wherein $p_n$ is a function of the distance between $y_n$ and another second input value; and
one or more intermediate description values $z_n$, wherein $z_n = z_{n-1} + p_n$; and
configuring the memory to store the two or more intermediate description values $z_n$ for each time step, wherein the intermediate description values $z_n$ are configured for two or more of the intermediate description values $z_n$ to be used in combination by the computer system in subsequent calculations to generate descriptive data, wherein two of the intermediate description values $z_n$ correspond to a start point and an end point of a range of interest, wherein the averaging periods are calculatable over unpredictable periods of time as well as calculatable over known periods of time, and wherein the averaging periods are calculatable over time-varying periods as well as calculatable over fixed periods of time;
wherein the subscriber requests a function, start point, and end point of range of interest, wherein the transmission server then sends intermediate description values $z_n$ corresponding to the request, wherein the subscriber performs a single operation to the intermediate description values $z_n$ to calculate the function.

2. The method of claim 1, wherein $x_n$ is a time value.

3. The method of claim 1, wherein $x_n$ is a numerical value.

4. The method of claim 3, wherein $x_{n+1} - x_n = x_n - x_{n-1}$.

5. The method of claim 4, wherein $x_n$ is a time value and $x_n - x_{n-1}$ is less than 0.

6. The method of claim 1, wherein i>1000.

7. The method of claim 1, wherein the second input value $y_n$ is a variable describing a financial transaction.

8. The method of claim 1, wherein
$p_n = y_n$;
$p_n = y_n^2$;
$p_n = x_n \cdot y_n$; or
$p_n$ is a function of the distance between $y_n$ and another second input value.

9. The method of claim 1, wherein for any value of n, $x_n$ has associated with it a further input value $y'_n$, and $p_n = y_n \cdot y'_n$.

10. A cyber-fraud security method for distributing customizable functions of data, the customizable functions of data including matching subsequences by measuring distances between corresponding records of two individual subsequences over a network to a remote subscriber computer, the method comprising:
receiving data at a transmission server sent from a data source over the Internet, the transmission server comprising a processor and memory that stores the remote subscriber's address and receives in real-time the remote subscriber's requested function of data;
formatting the incoming data into two or more intermediate description values $z_n$ for each time step:
calculating, via the processor, a quantity from a set of second input values $y_n$ corresponding to a portion of a sequence of first input values $x_n$ extending from n=a to n=b;
extracting from a database, at least an output value $z_n$, wherein n=b, using a memory that is configured to store a sequence of first input values $x_n$ wherein n=1, 2, ... i, wherein for any value of n, $x_n$ lies between $x_{n+1}$ and $x_{n-1}$ in the sequence, and has associated with it:
a second input value $y_n$;
a conversion value $p_n$ that is calculated from $y_n$ according to a conversion algorithm, wherein $p_n$ is a function of the distance between $y_n$ and another second input value; and
one or more intermediate description values $z_n$, wherein $z_n = z_{n-1} + p_n$;
configuring the memory to store the two or more intermediate description values $z_n$ for each time step, wherein the intermediate description values $z_n$ are stored in the database and configured for two or more of the intermediate description values $z_n$ to be used in combination by the computer system in subsequent calculations to generate descriptive data, wherein two of the intermediate description values $z_n$ correspond to a start point and an end point of a range of interest, wherein the averaging periods are calculatable over unpredictable periods of time as well as calculatable over known periods of time, and wherein the averaging periods are calculatable over time-varying periods as well as calculatable over fixed periods of time; and
performing a subsequent calculation to generate descriptive data, via at least one of the one or more processors, using the intermediate description values $z_n$ without recalculation of the intermediate description values $z_n$, thereby causing fewer operations to be required;
wherein the subscriber requests a function, start point, and end point of range of interest, wherein the transmission server then sends intermediate description values $z_n$ corresponding to the request.

11. A method according to claim 10, further comprising: extracting from the database a further output value $z_n$, wherein n=a.

12. A method according to claim 10, wherein the calculated quantity is:
the sum of the second input values $y_n$ corresponding to said portion of the sequence of first input values $x_n$;
an average of the second input values $y_n$ corresponding to said portion of the sequence of first input values $x_n$;
the variance of the second input values $y_n$ corresponding to said portion of the sequence of first input values $x_n$;
the distance covered by the second input values $y_n$ corresponding to said portion of the sequence of first input values $x_n$; or
the correlation of the second input values $y_n$ with the first input values $x_n$ corresponding to said portion of the sequence of first input values $x_n$.

13. A method according to claim 10, wherein the calculated quantity is:
an average of the product of the second input value $y_n$ and a further input value $y'_n$ corresponding to said portion of the sequence of first input values $x_n$; or
the correlation of the second input value $y_n$ with the further input value $y'_n$ corresponding to said portion of the sequence of first input values $x_n$, and
wherein for any value of n, $x_n$ has associated with it a further input value $y'_n$, and $p_n = y_n \cdot y'_n$.

14. A method according to claim 11, further comprising:
extracting additional values from the database at the same time as the extracting the further output value, the additional values being for storing in a cache for use in later calculations.

15. A method according to claim 14, wherein the further output value and the additional values together provide a subsequence of the sequence of output values $z_n$.

16. The method of claim 1, wherein values in the memory are examined for fraud by monitoring multiple mean averages over periods of time to detect relative changes that are small in magnitude over extended time periods.

17. The method of claim 1, wherein the memory is configured to store Euclidean distances between corresponding records from different time periods, wherein the Euclidean distances are stored in cumulative form, according to the formula:

$$\text{Cumulative Euclidean distance:} \sqrt{\sum_{1}^{r}(TA_r - TB_r)^2}$$

where r=a number of a record, TA is a first time period, and TB is a second time period.

18. The method of claim 10, wherein values in the memory are examined for fraud by monitoring multiple mean averages over periods of time to detect relative changes that are small in magnitude over extended time periods.

19. The method of claim 10, wherein the memory is configured to store Euclidean distances between corresponding records from different time periods, wherein the Euclidean distances are stored in cumulative form, according to the formula:

$$\text{Cumulative Euclidean distance:} \sqrt{\sum_{1}^{r}(TA_r - TB_r)^2}$$

where r=a number of a record, TA is a first time period, and TB is a second time period.

20. The method of claim 1, wherein the formatted data is stored in a disk.

21. The method of claim 1, wherein the formatted data is stored in a database.

* * * * *